US012591098B2

(12) United States Patent
Cams et al.

(10) Patent No.: US 12,591,098 B2
(45) Date of Patent: Mar. 31, 2026

(54) SHEATH TERMINATION AND RIBBON ORIENTING DEVICES AND METHODS FOR FLAT OPTICAL FIBER RIBBONS

(71) Applicant: CommScope Technologies LLC, Hickory, NC (US)

(72) Inventors: Eddy Luc Cams, Bilzen (BE); Maarten Michiels, Herent (BE); Cornelia Van De Velde, Herselt (BE); Erwin Beckers, Werchter (BE)

(73) Assignee: CommScope Technologies LLC, Hickory, NC (US)

( * ) Notice: Subject to any disclaimer, the term of this patent is extended or adjusted under 35 U.S.C. 154(b) by 278 days.

(21) Appl. No.: 18/548,033

(22) PCT Filed: Feb. 22, 2022

(86) PCT No.: PCT/US2022/017314
§ 371 (c)(1),
(2) Date: Aug. 25, 2023

(87) PCT Pub. No.: WO2022/182657
PCT Pub. Date: Sep. 1, 2022

(65) Prior Publication Data
US 2024/0134139 A1    Apr. 25, 2024
US 2024/0231028 A9    Jul. 11, 2024

Related U.S. Application Data

(60) Provisional application No. 63/153,625, filed on Feb. 25, 2021.

(51) Int. Cl.
*G02B 6/44* (2006.01)

(52) U.S. Cl.
CPC ....... *G02B 6/4442* (2013.01); *G02B 6/44715* (2023.05); *G02B 6/44528* (2023.05); *G02B 6/4471* (2013.01)

(58) Field of Classification Search
CPC . G02B 6/4442; G02B 6/44715; G02B 6/4471
See application file for complete search history.

(56) References Cited

U.S. PATENT DOCUMENTS 4,762,387 A    8/1988 Batdorf et al.
5,566,269 A    10/1996 Eberle, Jr. et al.
(Continued)

FOREIGN PATENT DOCUMENTS

EP    1 168 018 A2    1/2002
EP    2 482 108 B1    5/2014
(Continued)

OTHER PUBLICATIONS

Pages from HellermannTyton, 6 pages (2015).
(Continued)

*Primary Examiner* — Sung H Pak
(74) *Attorney, Agent, or Firm* — Merchant & Gould P.C.

(57) ABSTRACT

Devices and methods for retaining, orienting, and/or fanning out flat optical fiber ribbons. The devices are configured to anchor end portions of sheaths holding multiple flat optical fiber ribbons as the flat fiber ribbons enter a fiber management tray via the retaining, orienting, and/or fanning out device.

21 Claims, 15 Drawing Sheets

(56)　　　　　References Cited

U.S. PATENT DOCUMENTS

| | | | |
|---|---|---|---|
| 7,068,907 B2 | 6/2006 | Schray | |
| 9,310,578 B2 * | 4/2016 | Vastmans | G02B 6/4292 |
| 2010/0329624 A1 * | 12/2010 | Zhou | G02B 6/4454 |
| | | | 385/135 |
| 2020/0233172 A1 | 7/2020 | Prevratil et al. | |
| 2020/0285012 A1 | 9/2020 | Gronvall et al. | |
| 2021/0124140 A1 * | 4/2021 | Solheid | G02B 6/44715 |

FOREIGN PATENT DOCUMENTS

| | | |
|---|---|---|
| WO | 02/097505 A1 | 12/2002 |
| WO | 2019/191570 A1 | 10/2019 |

OTHER PUBLICATIONS

International Search Report and Written Opinion for Application No. PCT/US2022/017314 mailed Jun. 7, 2022.
Installation Instructions for Cable Blocking Kit Moisture Blocking for FOSC 400 Splice Closure Kits, CommScope, Inc., 8 pages (Jan. 2017).
Installation Instructions for Cable Blocking Kit—Small for Fiber Panels, TC-96277-IP • Rev A, CommScope, Inc., 2 pages (Sep. 2019).
Installation Instructions for Field Installed Fanout Kit For 144- & 288-Fiber Rollable Ribbon Cable, TC-96280-IP, Rev A, CommScope, Inc., 14 pages (Jan. 2020).
Product Specification Sheet for NG4-CBOUT-288 Fiber Optic Ribbon Breakout Kit, High Density, 1:3, 288f in—96f × 3 out, CommScope, Inc., 1 page (Oct. 31, 2020).

* cited by examiner

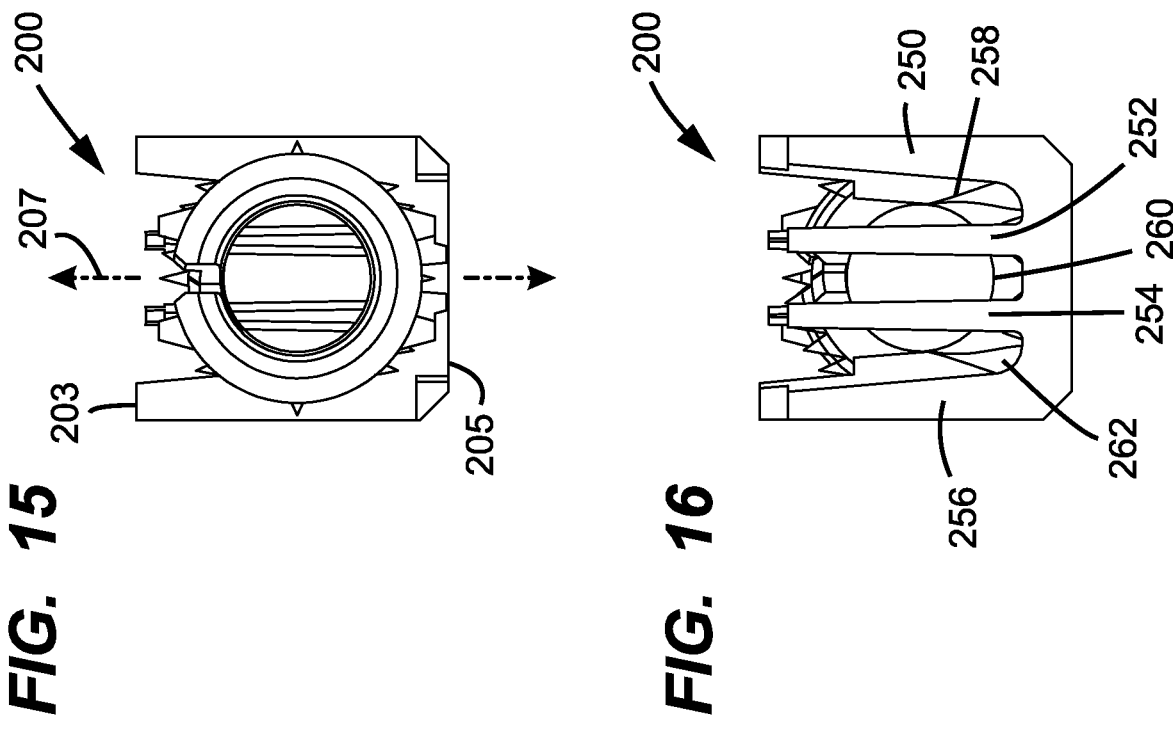
FIG. 15
FIG. 16
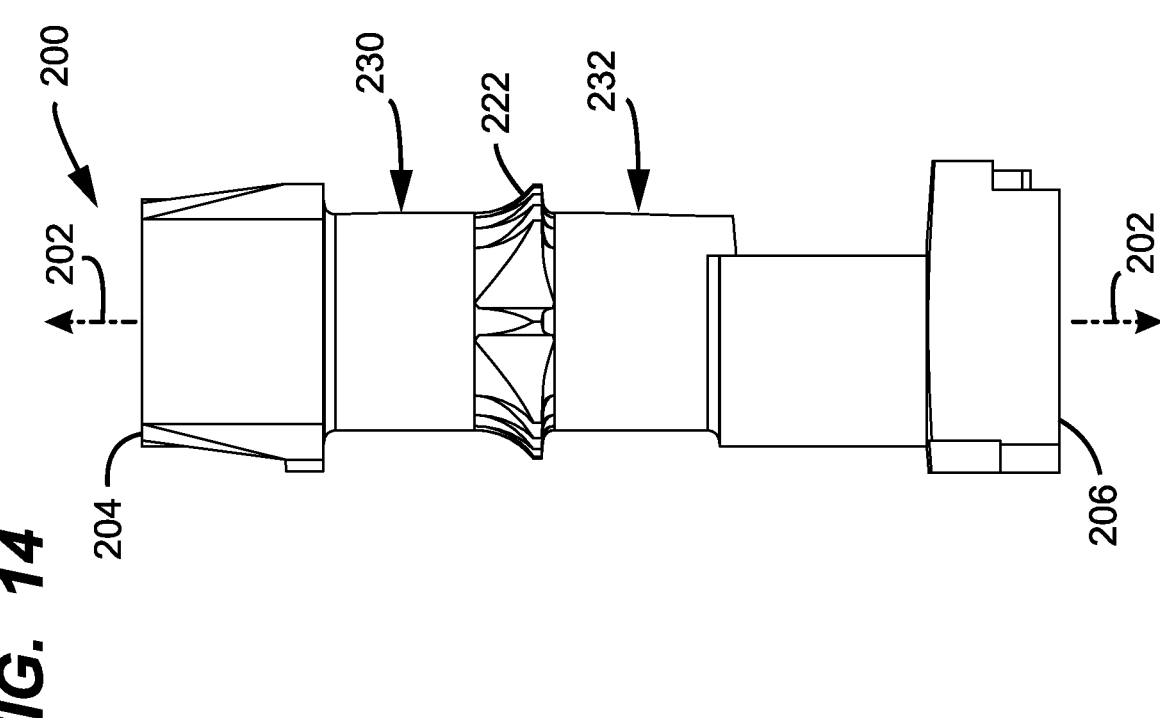
FIG. 14

SHEATH TERMINATION AND RIBBON ORIENTING DEVICES AND METHODS FOR FLAT OPTICAL FIBER RIBBONS

CROSS-REFERENCE TO RELATED APPLICATION

This application is a National Stage Application of PCT/US2022/017314, filed on Feb. 22, 2022, which claims the benefit of U.S. Patent Application Ser. No. 63/153,625, filed on Feb. 25, 2021, the disclosures of which are incorporated herein by reference in their entireties. To the extend appropriate, a claim of priority is made to each of the above disclosed applications.

BACKGROUND

Fiber optic cables carry optical fibers used to transmit optical signals between providers and subscribers. Typically, large cables, such as trunk cables or "main" cables, carry a large number of fibers. The fibers of the main cable are spliced, split, optically connected to other fibers via fiber optic connectors), or otherwise managed and routed to a desired destination, (e.g., a subscriber building). Due to the large number of fibers that need to be managed and routed, the main cable is often terminated in a fiber optic splice closure. Such fiber optic splice closures typically include an outer ruggedized and sealable shell defining an interior volume and one or more sealable ports for sealed cable entry to the interior. The closures can be adapted for outdoor or indoor use. The interior volume of a splice closure typically houses structures and equipment, such as splice trays to organize and route fibers to facilitate both storing of fibers and routing of fibers to their desired destinations.

The fibers of the cables that enter the closures can come in different forms, such as loose fibers or ribbonized fibers. Groups of loose fibers, e.g., groups of ribbonized fibers, or axial portions thereof, can be housed in sheaths that hold the groups together until their separation is needed to perform fiber management (e.g., fiber end processing, splicing, splitting, wave division multiplexing) of the individual ribbons. Typically, flat ribbonized fibers (which make up a flat fiber ribbon) include a plurality of fibers, e.g., 12 fibers, bonded together. The individual fibers of the ribbon can be bonded side by side along their axial lengths to form a flat ribbon.

SUMMARY

In general terms, the present disclosure is directed to improvements in the management of optical fibers.

In some examples, the present disclosure is directed to improvements in the management of flat optical fiber ribbons at telecommunications equipment, such as an optical fiber organizer, a telecommunications closure, etc.

More specifically, in some examples, devices and methods according to the present disclosure are directed to improvements in managing sheathed groups of flat optical fiber ribbons at fiber management trays of optical fiber organizers of telecommunications closures.

According to certain aspects of the present disclosure, an assembly includes: a sheath; flat optical fiber ribbons having longitudinal portions positioned in the sheath, each ribbon including optical fibers arranged side by side in a row, the row defining a transverse dimension of the ribbon; and a flat fiber ribbon management device extending from a proximal end of the device to a distal end of the device along a horizontal axis defined by the device, the sheath being coupled to an exterior surface of the device, the ribbon management device including a device body, the device body including: a ribbon retention portion; and a ribbon fanout portion including fins defining channels, the channels being configured to maintain the ribbons within the channels such that the transverse dimension of each ribbon is substantially aligned with a vertical axis.

According to further aspects of the present disclosure, a method includes: providing a plurality of flat fiber ribbons having longitudinal portions positioned in a sheath, each ribbon including optical fibers arranged side by side in a row, the row defining a transverse dimension of the ribbon; loading the ribbons into a flat fiber ribbon management device extending from a proximal end of the device to a distal end of the device along a horizontal axis defined by the device, the device including a device body, the device body including: a ribbon retention portion; and a ribbon fanout portion including fins defining channels, the loading including loading the ribbons into both the ribbon retention portion and the ribbon fanout portion; arranging the ribbons in the channels such that the transverse dimension of each ribbon is substantially aligned with a vertical axis; and securing the sheath to an exterior surface of the device.

According to further aspects of the present disclosure, a flat optical fiber ribbon management device extending from a proximal end of the device to a distal end of the device along a horizontal axis defined by the device, includes: a device body, including: a ribbon retention portion; and a ribbon fanout portion including fins defining channels, the channels being configured to maintain flat optical fiber ribbons within the channels, each ribbon including optical fibers arranged side by side in a row, the row defining a transverse dimension of the ribbon, the channels being configured to maintain the flat optical fiber ribbons within the channels such that the transverse dimension of each ribbon is substantially aligned with a vertical axis, wherein an exterior surface of the device is configured to couple to a sheath holding the ribbons.

A variety of additional aspects will be set forth in the description that follows. The aspects relate to individual features and to combinations of features. It is to be understood that both the foregoing general description and the following detailed description are exemplar and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

FIG. 14 is a side planar view of the device of FIG. 10.

FIG. 15 is a proximal end view of the device of FIG. 10.

FIG. 16 is a distal end view of the device of FIG. 10.

DETAILED DESCRIPTION

Figure 1:
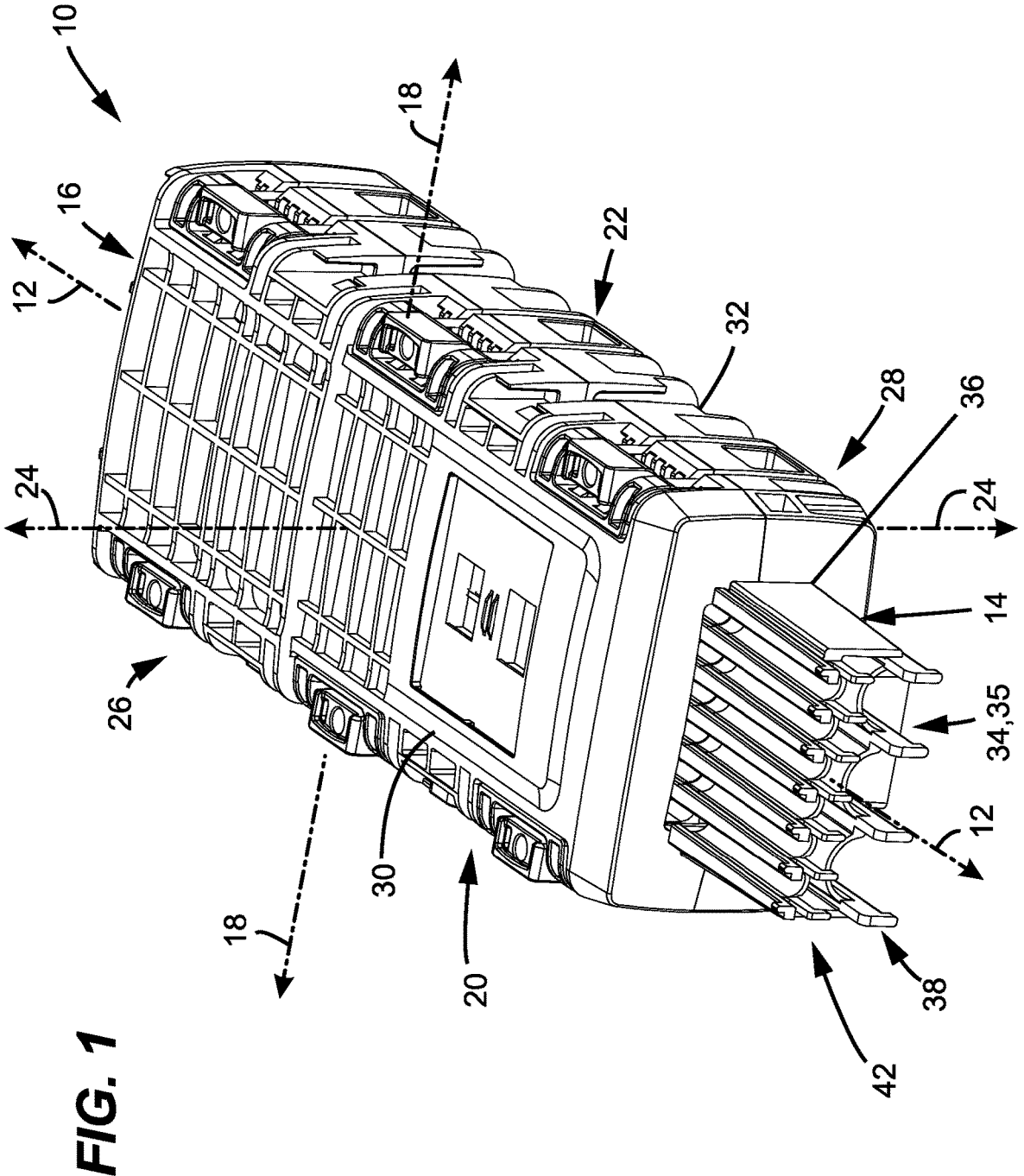
FIG. 1 is a perspective view of a telecommunications closure in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
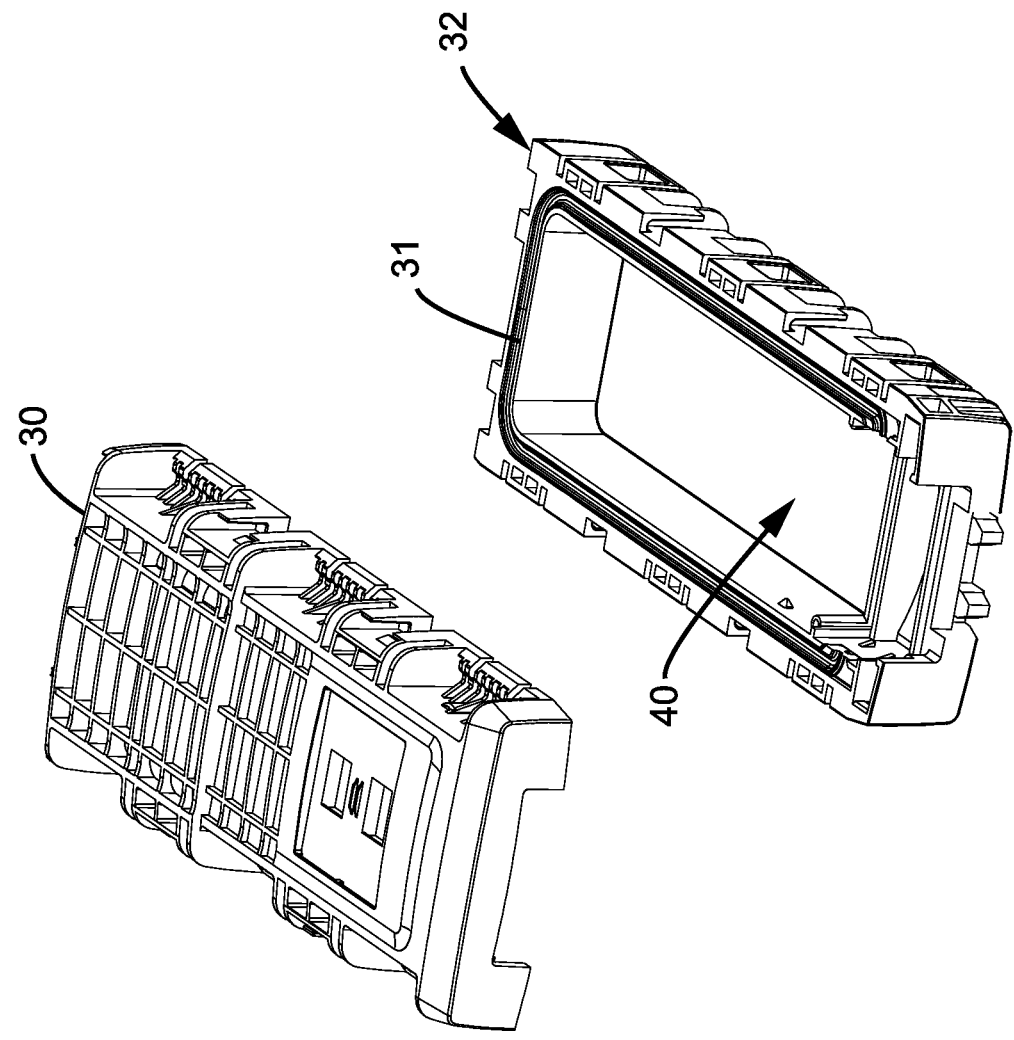
FIG. 2 is a perspective view of the housing pieces of the closure of FIG. 1.
Figure 3:
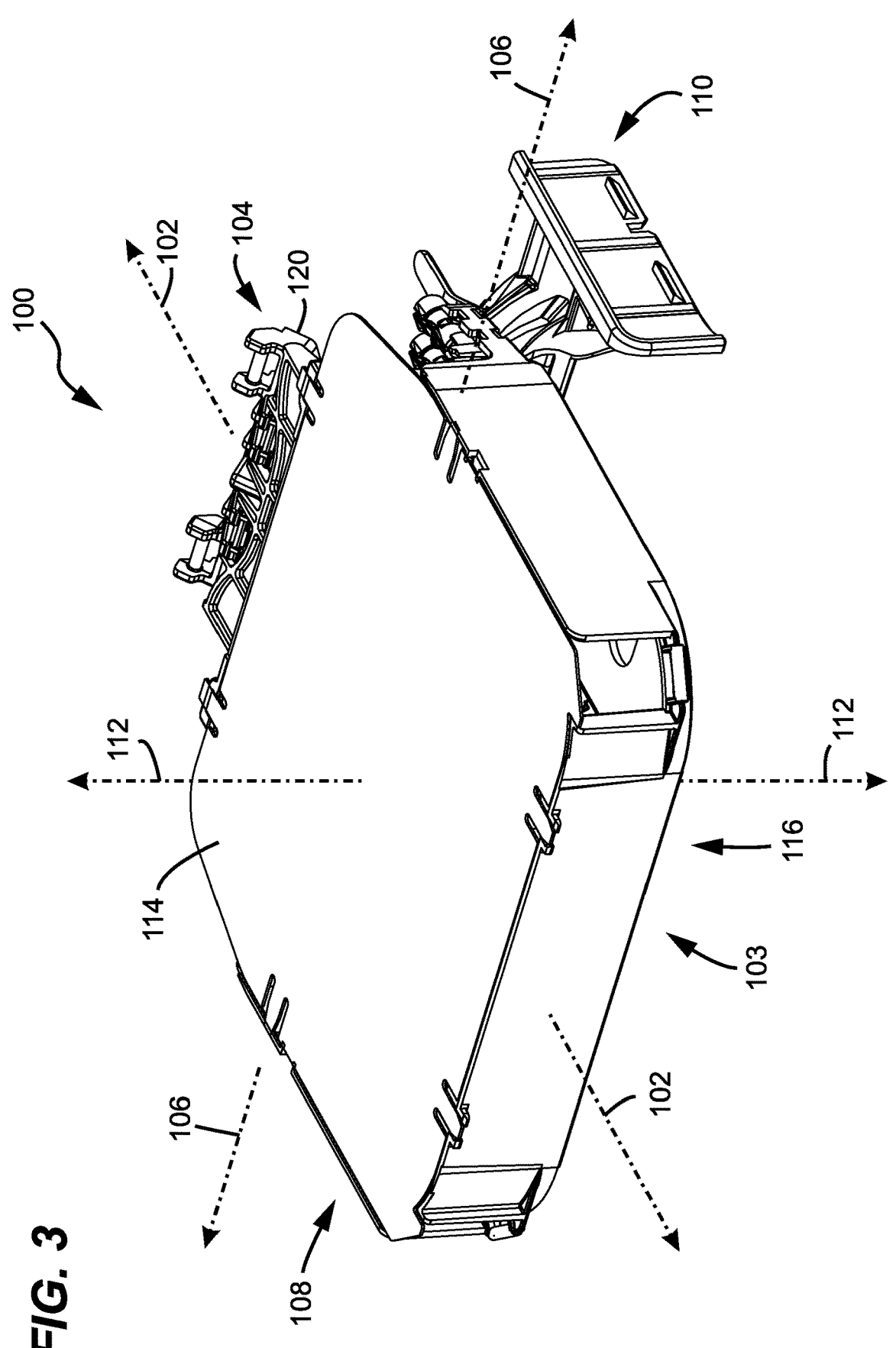
FIG. 3 is a perspective view of a fiber management subassembly of a fiber organizer according to the present disclosure.
Figure 4:
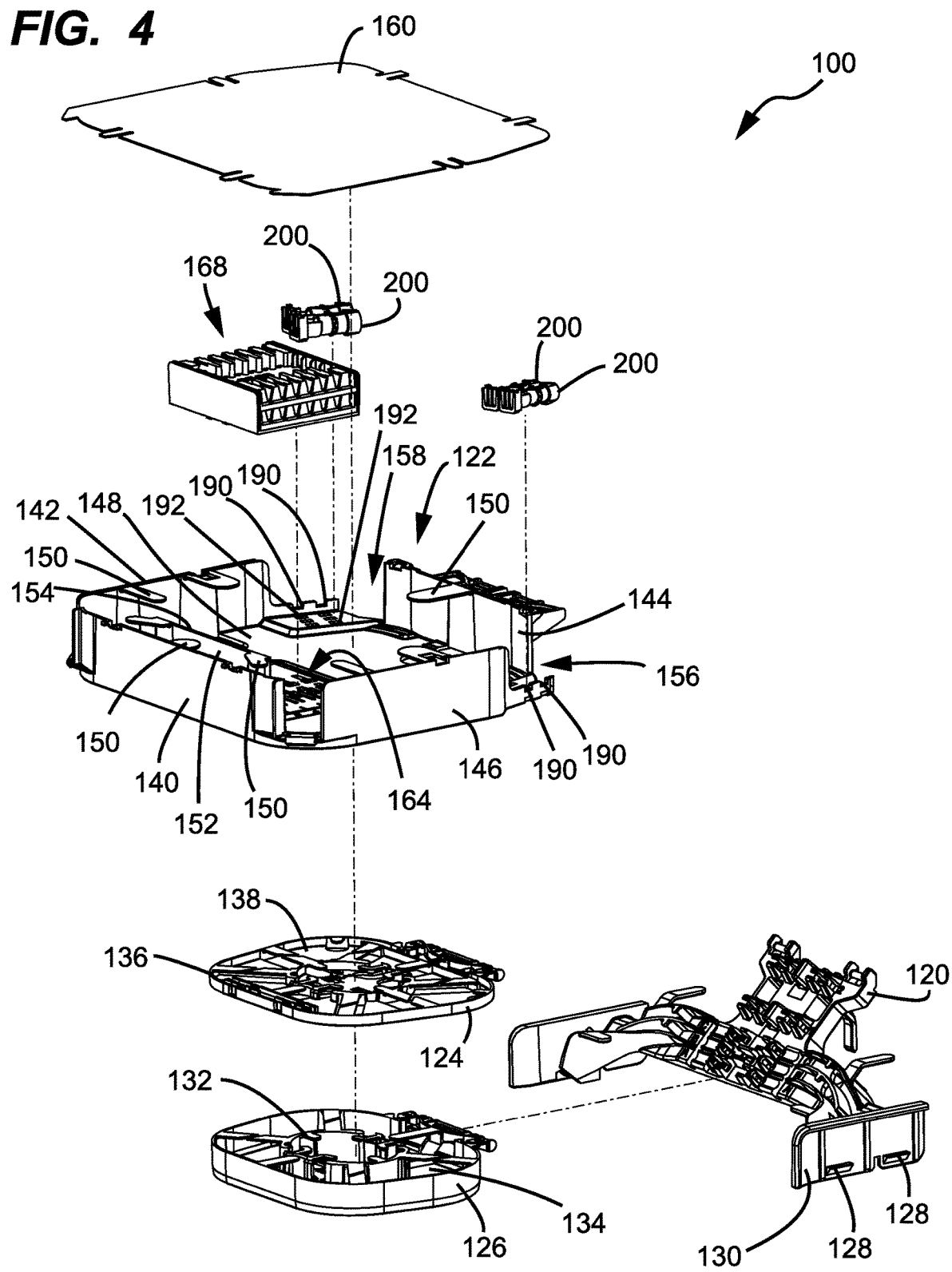
FIG. 4 is an exploded view of the subassembly of FIG. 3.
Figure 5:
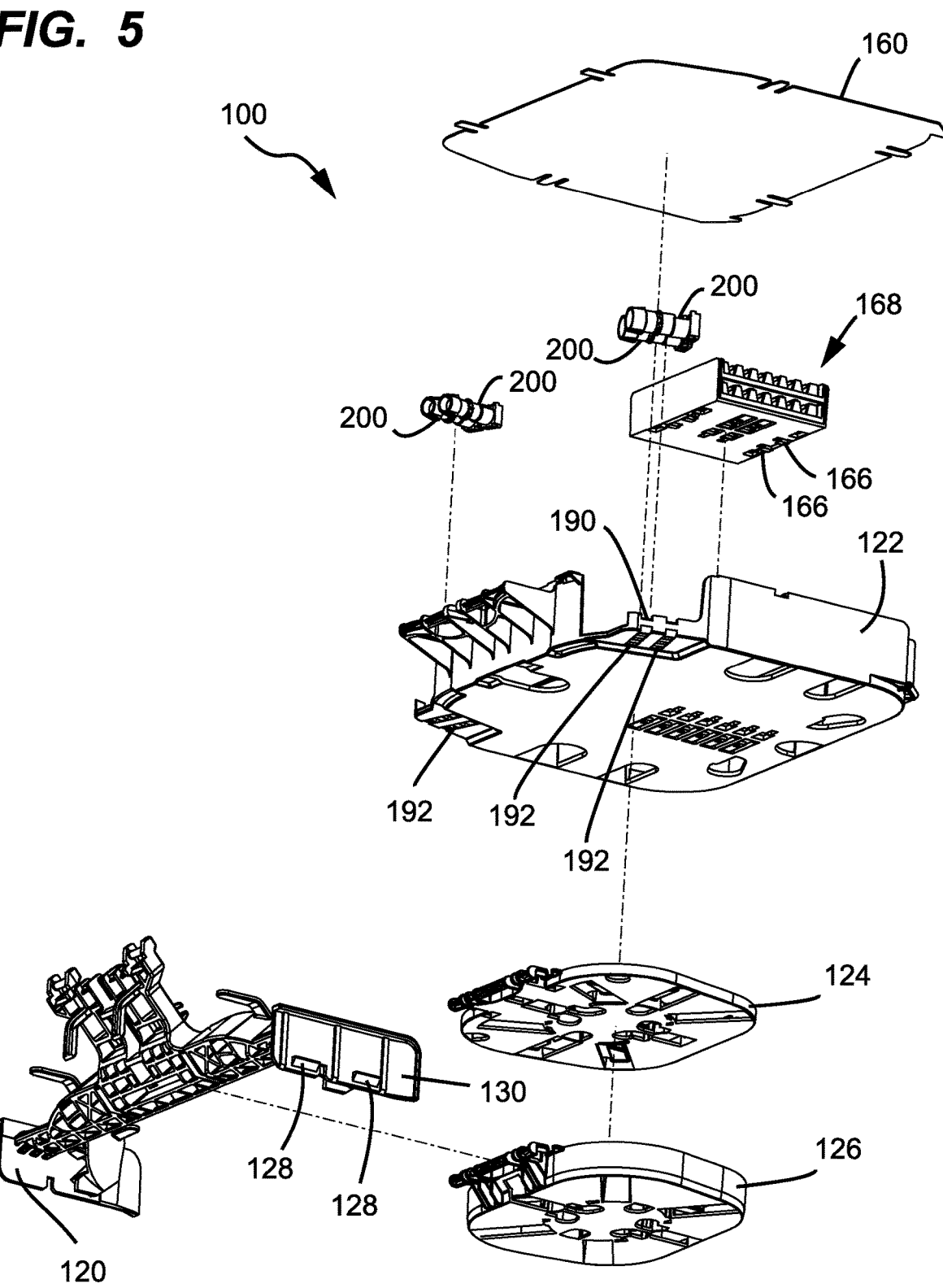
FIG. 5 is a further exploded view of the subassembly of FIG. 3.
Figure 6:
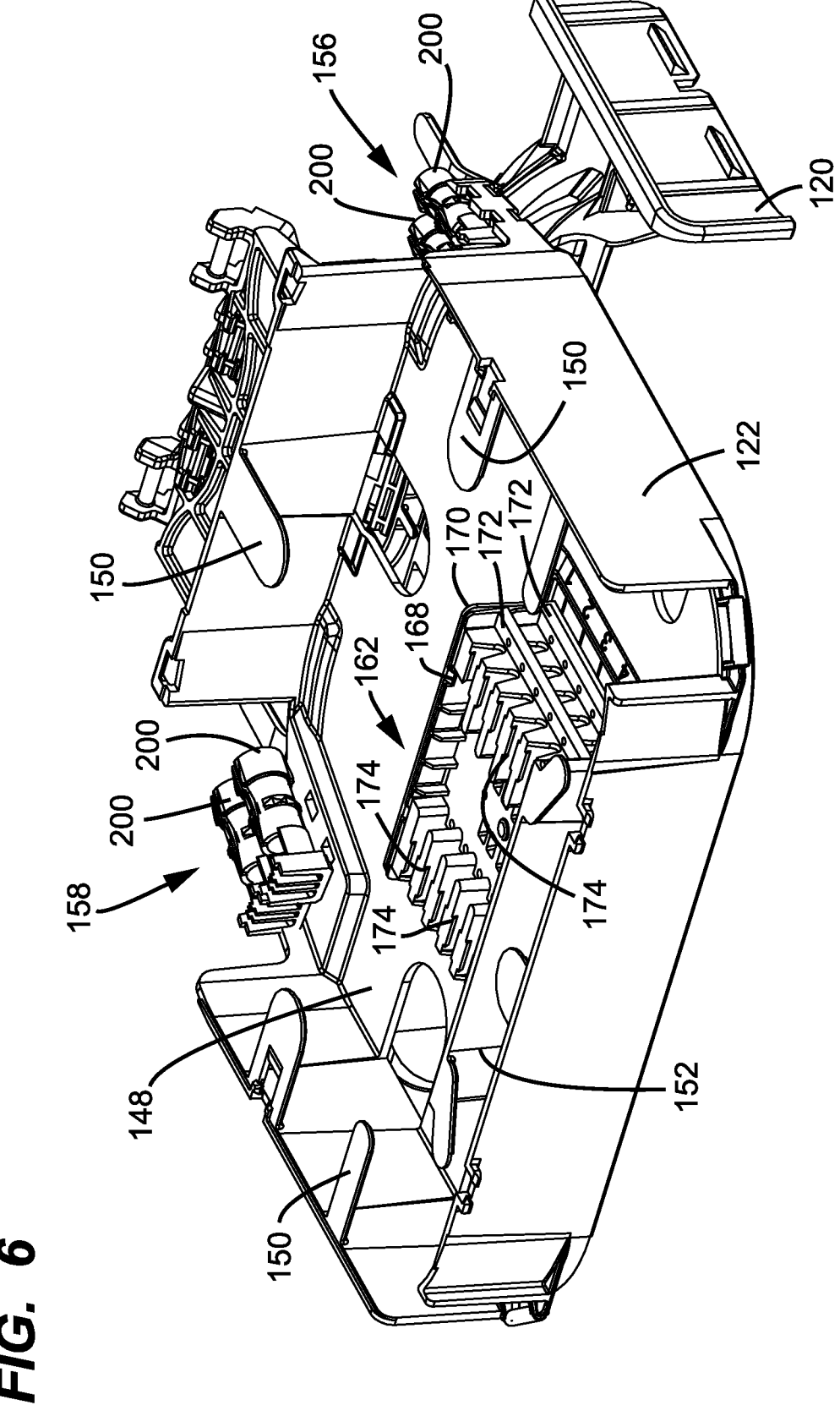
FIG. 6 is a perspective view of the subassembly of FIG. 3, with the flat ribbon management tray cover removed.
Figure 7:
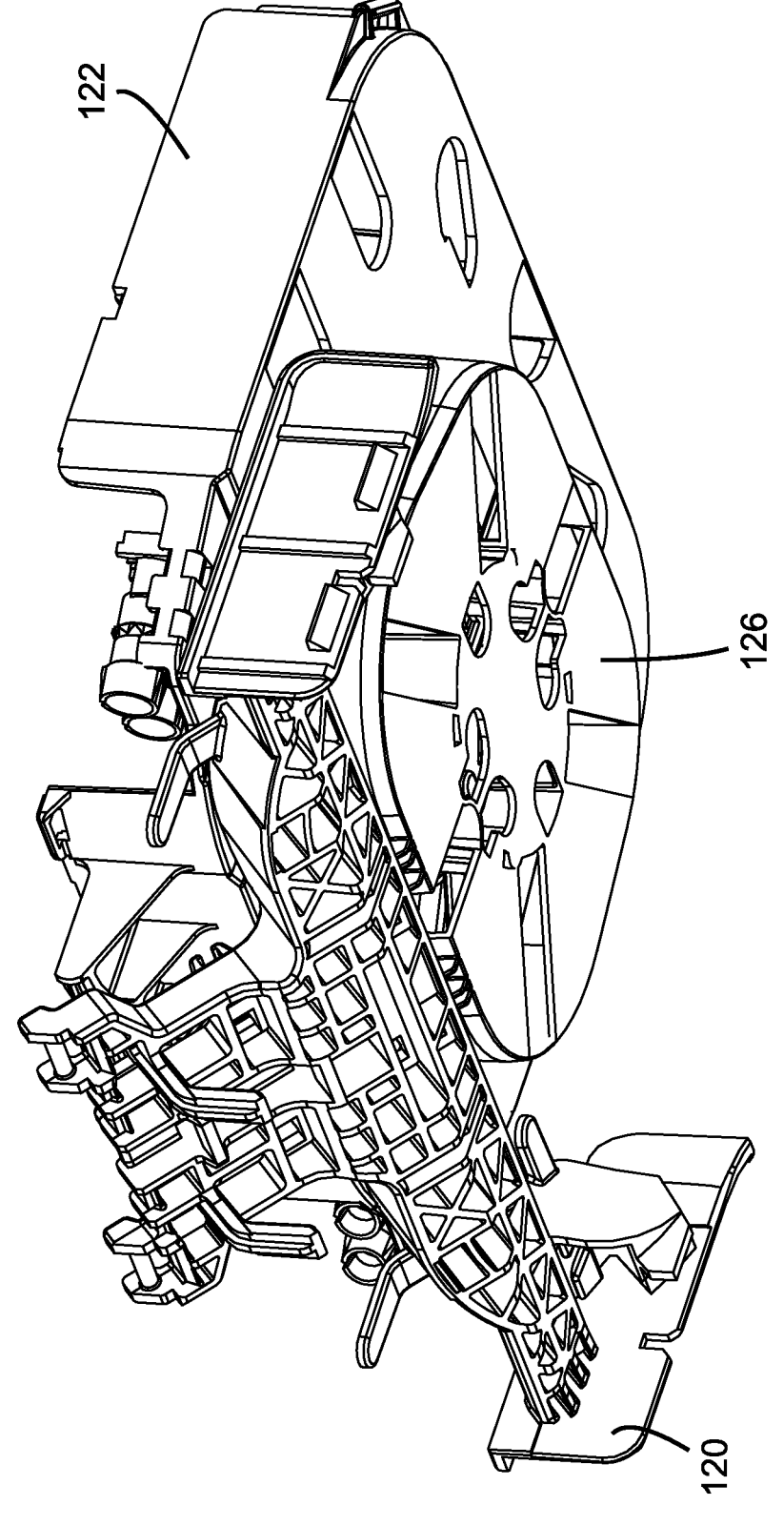
FIG. 7 is a further perspective view of the subassembly of FIG. 3, with the flat ribbon management tray cover removed.
Figure 8:
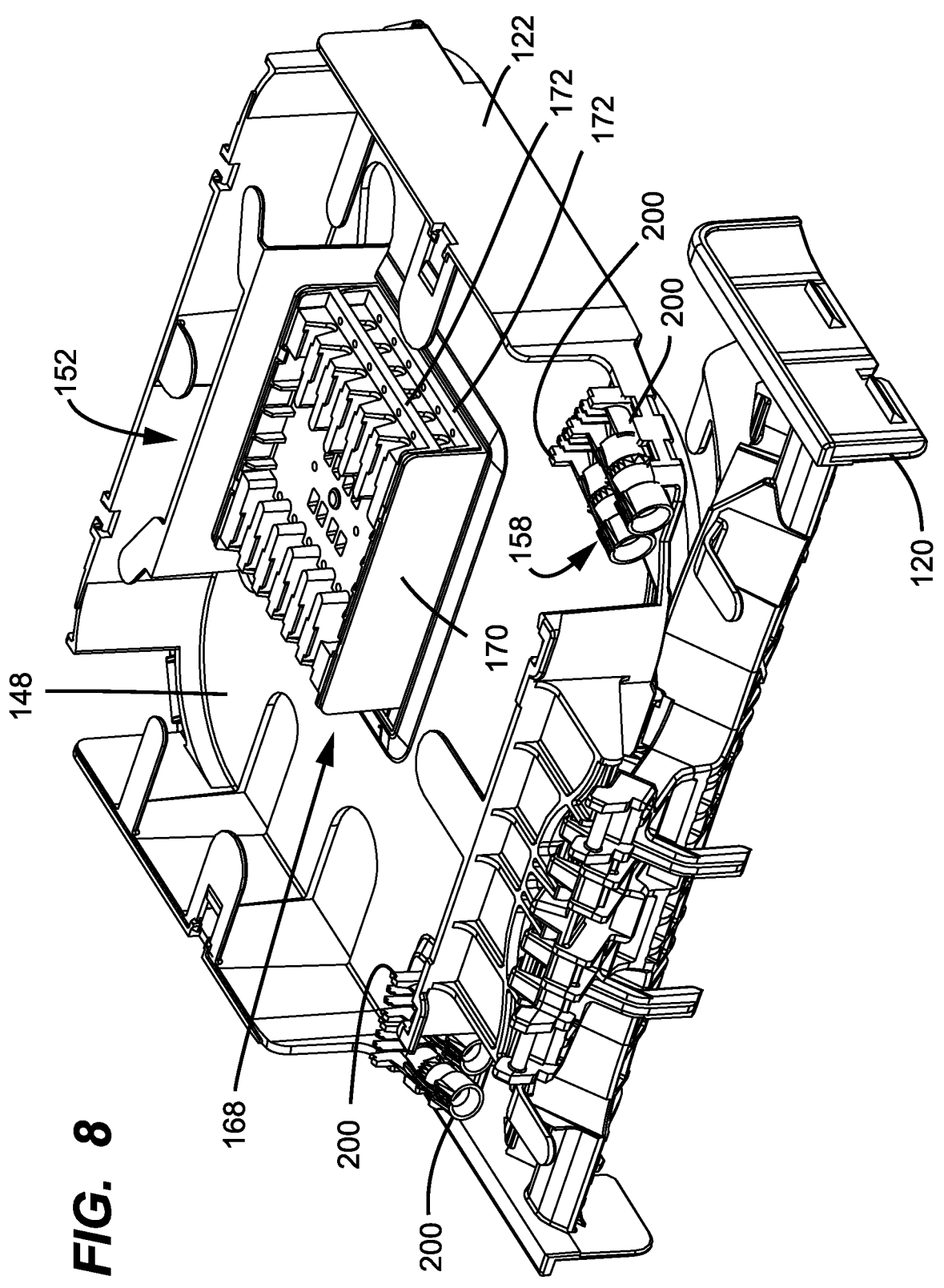
FIG. 8 is a further perspective view of the subassembly of FIG. 3, with the flat ribbon management tray cover removed.
Figure 9:
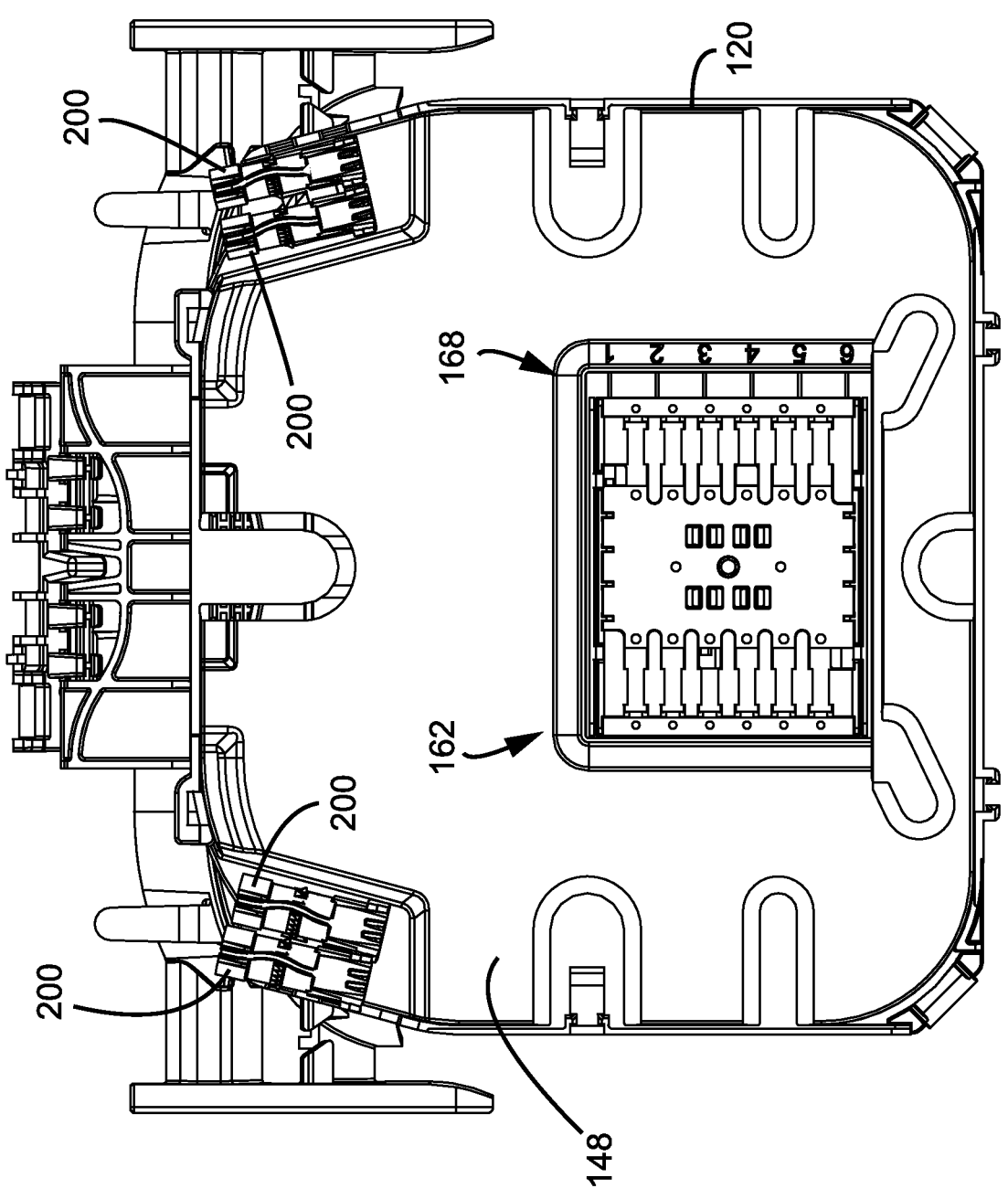
FIG. 9 is a top view of the subassembly of FIG. 3, with the flat ribbon management tray cover removed.
Figures 10, 11:
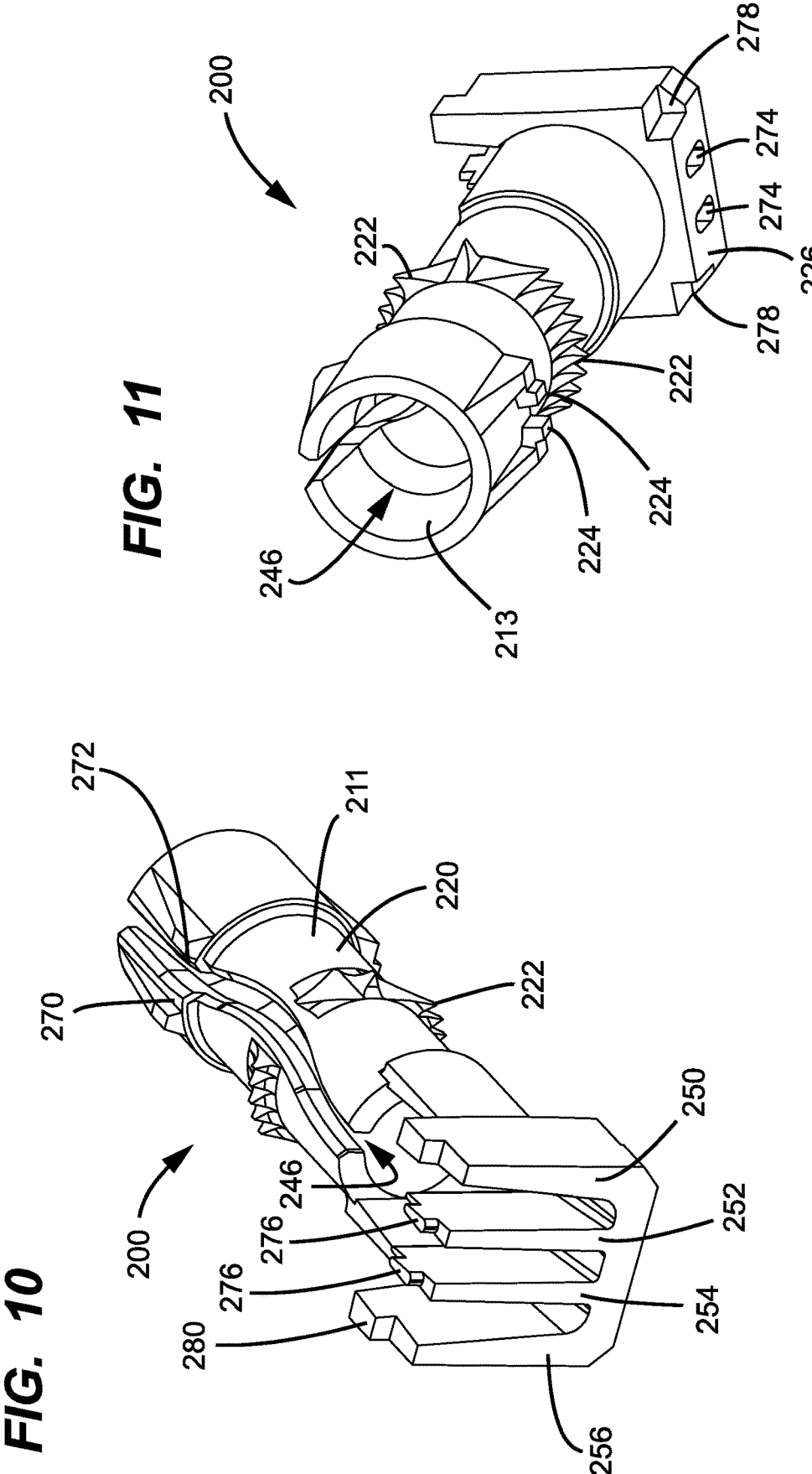
FIG. 10 is a perspective view of the example sheath termination and fiber ribbon orienting device of the subassembly of FIG. 3.
FIG. 11 is a further perspective view of the device of FIG. 10.
Figure 13:
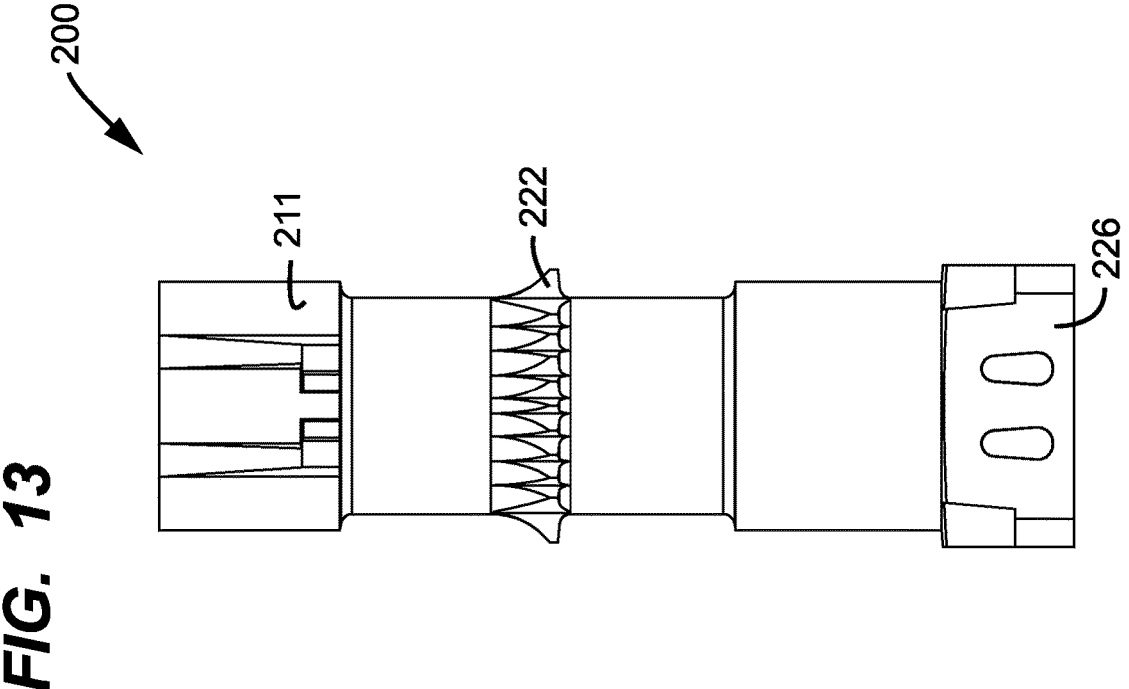
FIG. 13 is a bottom planar view of the device of FIG. 10.
Figure 12:
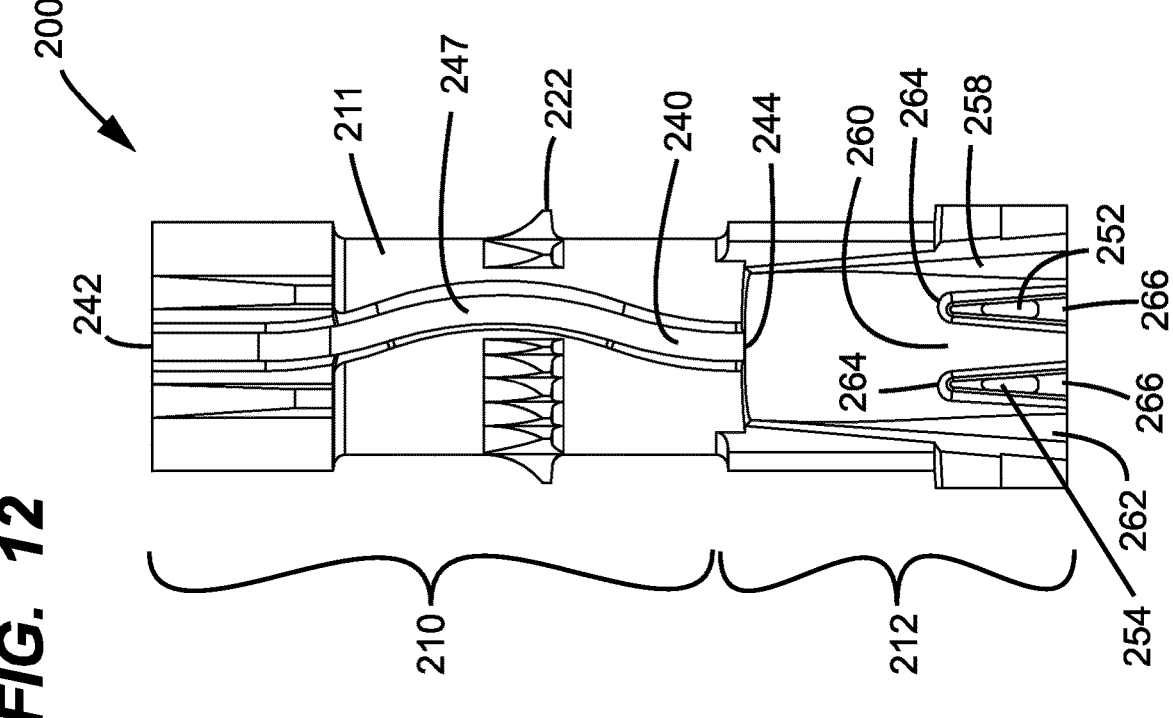
FIG. 12 is a top planar view of the device of FIG. 10.

Referring to FIGS. 1 and 2, a telecommunications closure 10 extends along a longitudinal axis 12 between a proximal end 14 and a distal end 16. The closure 10 extends along a transverse axis 18 between a first side 20 and a second side 22. The closure 10 extends along a vertical axis 24 between a top 26 and a bottom 28. The axes 12, 18 and 24 are mutually perpendicular, with the axes 12 and 18 defining a horizontal plane.

As used herein, terms such as proximal, distal, top, bottom, upper, lower, above, below, up, down, vertical, horizontal and so forth will be used with reference to the axes 12, 18, and 24 of FIG. 1 and in relating the positions of one component to another with respect how those components are positioned within the closure of FIG. 1. These relative terms are for ease of description only, and do not limit how the closure 10 or any individual component or combination of components, may be oriented in practice.

The closure 10 includes a first upper housing piece 30 and a second lower housing piece 32 that cooperate (e.g., with hinges, clamps, etc.) to form a sealable and re-enterable closure volume 40. A perimeter seal element 31 forms a seal about three sides of the closure volume 40 when the closure 10 is in a sealed and closed configuration.

The closure volume 40 is configured to house a fiber management organizer 34. Cables enter the closure volume 40 via the opening 36 and sealed cable ports defined by the internal portion of the cable organizer 34.

The cable organizer 34 is configured to accommodate relatively thick cables (such as feeder cables and branch cables) entering the closure 10 via a lower region 38 of the cable organizer 34, and relatively thin cables (such as drop cables) entering the closure via an upper region 42 of the cable organizer 34.

Referring now to FIGS. 3-9, a subassembly 100 of a fiber management organizer (or organizer) in accordance with the present disclosure will be described. The subassembly 100 can cooperate with housing pieces of a closure such as the closure described above. For example, the subassembly 100 can be mounted to a main organizer body and housed within the closure volume 40. Optical fibers entering the closure 10 can be routed from the cables entering the subassembly 100 via fiber routing structures of the main organizer body to the subassembly 100.

Once at the subassembly 100, the fibers can be managed as needed. For example, loops of fiber can be stored using the subassembly 100. Splices, splitters, wave division multiplexers, fiber optic connectors, fiber optic adapters, and other fiber management components can be supported at the subassembly 100 using various fiber management features of the subassembly 100. By managing the fibers in this manner, optical signals can be routed between cables using the telecommunications closure. For example, optical signals can be routed from a network provider side feeder cable to one or more network subscriber side drop cables. Optical signals can also be routed from one branch cable to another branch cable, or from a feeder cable to a branch cable. In some examples, a branch cable is used to optically connect two telecommunications closures.

The subassembly 100 extends along a first axis 102 from a proximal end 103 to a distal end 104, along a second axis 106 from a first side 108 to a second side 110, and along a vertical axis 112 from a top 114 to a bottom 116. The axes 102, 106 and 112 are mutually perpendicular, with the axes 102 and 106 defining a horizontal plane.

The subassembly 100 includes a tray support 120. The tray support 120 is configured to pivotally support fiber management trays in a stack, such as the trays 122, 124, and 126. Lower ones of the trays can be accessed by pivoting up the tray(s) above without de-coupling the trays from the tray support 120.

The tray support 120 includes flanges 130 that include catches 128. The catches 128 can snappingly engage a main body of a fiber organizer to thereby mount the tray support 120 to the rest of the organizer.

The tray 126 is configured to store loops of optical fibers at a walled fiber management surface 134 and around a spool structure 132. In some examples, the optical fibers are housed in tubes and the tubes are stored in loops around the spool structure 132. The loops of fibers or loops of tubed fibers can be stored in the tray 126 until those fibers are required for optical signal routing through the telecommunications closure.

The tray 124 is configured to hold protective bodies of splices (e.g., mechanical splices, fusion splices) between individual fibers. The tray 124 supports splice body holders (or splice holders) 136 at a fiber management surface 138.

Fibers are routed on the fiber management surface 138 to the splice body holders 136, which hold the protective bodies of the splices.

The trays 124 and 126 each define entryways for fibers to enter the tray 124, 126 from two different directions. A given fiber or tube can enter the tray 126 through one of the entryways of the tray 126 and exit through the other entryway of the tray 126. A given spliced fiber can enter the tray 124 through one of its entryways and exit the tray 124 through the other entryway.

The tray 122 includes walls 140, 142, 144, 146 that extend from an outer edge of a fiber management surface 148. A wall 154 and the wall 140 define a proximal guide channel 152 through which portions of looped fiber can be routed. Retaining tabs 150 extend from the walls 140, 142, 144, 146, 154 parallel to the fiber management surface 148.

The vertical distance between the fiber management surface 148 and the retaining tabs 150 is configured for retaining and routing flat fiber ribbons between the surface 148 and the tabs 150, with the dimension of the flat fiber ribbons that is: a) perpendicular to the longitudinal fiber axes; and b) parallel to the maximum width dimension (referred to herein as the flat ribbon transverse width) of the flat fiber ribbons perpendicular to the longitudinal fiber axes, being oriented vertically in the tray 122 (referred to herein as vertical orientation).

Figure 22:
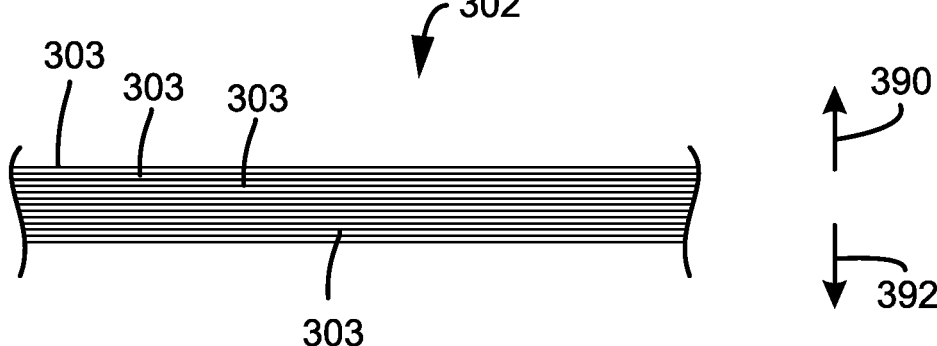
FIG. 22 illustrates a portion of an example flat optical fiber ribbon that can be managed using devices, methods and assemblies of the present disclosure.

The vertical orientation of a longitudinal portion of a flat optical fiber ribbon 302 is illustrated in FIG. 22. Referring to FIG. 22, the fiber ribbon 302 includes 12 fibers 303 bonded together in a single vertical row of the fibers 303 along their longitudinal (left to right) lengths. The vertical plane is the plane of the page in FIG. 22. The upward direction is represented by the arrow 390, and the downward direction is represented by the arrow 392. The flat fiber ribbon 302 is in the vertical orientation in FIG. 22. The flat fiber ribbon 302 has a flat ribbon transverse width W.

In some examples, the vertical distance between the fiber management surface 148 and the retaining tabs 150 is greater than twice the flat ribbon transverse width, such that flat fiber ribbon splice bodies can be vertically stacked in the splice holder area 162.

Optionally, the tray 122 can be provided with a protective cover 160 that snappingly and removably engages the walls. To perform fiber management on the tray 122, the cover 160 can be removed, and then replaced.

Flat fiber ribbons can enter and exit the tray 122 via entryways 156 and 158. Once on the tray 122, flat fiber ribbons can be looped in their vertical orientation between the surface 148 and the tabs 150, and optionally through the channel 152 to the splice holder area 162. The splice holder area 162 includes structures 164 that complement structures 166 of a splice holder arrangement 168, such that the splice holder arrangement 168 can be securely mounted to the splice holder area 162 by mating the structures 164 with the structures 166.

The splice holder arrangement 168 includes a bracket 170 that snappingly engages and securely holds two vertically stacked splice holder banks 172. Each splice holder hank 172 includes wall structures configured to securely hold protective bodies surrounding splices of flat fiber ribbons in the vertical orientation.

Hat fiber ribbons and splices that can be accommodated by the tray 122 include flat ribbons having, e.g., at least 4 fibers, at least 8 fibers, at least 12 fibers, at least 24 fibers or more. The splice holder arrangement 168 can accommodate protective splice bodies between splices of up to at least 12 pairs of flat fiber ribbons, including up to at least 6 pairs of flat ribbons per splice holder bank 172.

Positioned at the entryways 156 and 158 and mounted to the tray 122 are sheath termination and fiber ribbon orienting devices 200. Any suitable number of devices (e.g., 0, 1, 2, 3, 4, or more) devices 200 can be mounted at either entryway 156, 158. Each device 200 or group of devices (e.g., group of two or more devices 200) can be mounted to the tray 122 using one or more clamps, such as one or more T-wraps or zip ties, that is/are positioned to fully surround the device(s) 200 and passes through one or more of the notches 190 and or fully enclosed openings 192 defined by the tray 122 to thereby secure the device(s) 200 to the tray 122. A single T-wrap or zip tie can be used to secure multiple devices 200.

Referring to FIGS. 10–46, the device 200 has an elongate horizontal dimension extending along an axis 202 from an open proximal end 204 of the device 200 to an open distal end 206 of the device 200. The device 200 extends vertically along a vertical axis 207 from a top 203 of the device 200 to a bottom 205 of the device 200.

The device 200 includes several advantageous features for installing, retaining and orienting flat fiber ribbons and retaining a longitudinal end portion of a sheath holding flat fiber ribbons.

Between the jacketed end of a cable and a fiber management tray, such as the tray 122 (FIGS. 3-9), groups of flat fiber ribbons are typically housed in a protective sheath. The sheath can be, e.g., constructed of a mesh material. The sheath is configured to hold the group of flat fiber ribbons groups together until their separation is needed to perform fiber management (e.g., fiber end processing, splicing, splitting, wave division multiplexing) of the individual flat ribbons on the tray 122 (FIGS. 3-9). Thus, the sheath typically terminates as the flat fiber ribbons enter the tray 122, and the flat fiber ribbons are then routed on the tray 122 (FIGS. 3-9).

Typically, the end of the sheath must be secured at or about the location where the fiber ribbons within the sheath fan out on the tray 122. In addition, the flat fiber ribbons must be in their vertical orientations at the splice holder arrangement 168, which is configured to hold the splice protective bodies of flat fiber ribbons with the flat fiber ribbons in their vertical orientation. To avoid tangling and twisting of the flat fiber ribbons, it can be therefore advantageous to maintain the flat fiber ribbons in their vertical orientation for the entirety of the flat fiber ribbon routing on the tray 122. Without orientation guidance, flat fiber ribbons can tend towards various different non-vertical orientations, which can present a challenge to manage the flat fiber ribbons on a fiber management tray.

The device 200 includes features that facilitate one or more of: securing the end of the sheath; loading flat fiber ribbons into the device 200; and orienting the flat fiber ribbons in their vertical orientations as they fan out from the distal end of the device 200 onto the tray 122.

The device 200 includes a body 211. The body 211 can be, e.g., a unitarily integrated molded part. For example, the body 211 can be molded from a polymeric material. The body 211 includes a ribbon retention portion 210 and a ribbon fanout portion 212 which are adjacent each other along the axis 202. The ribbon retention portion 210 is configured to itself retain flat fiber ribbons without requiring any other part or component. The ribbon retention portion 210 is substantially tubular, with an inner surface 213 of the ribbon retention portion 210 being substantially cylindrical and defining a ribbon retention volume 246.

Projecting radially away from the axis 202 and from the exterior surface 220 of the body 211 are teeth 222. The teeth 222 are configured to hold an end portion of a sheath in place while the flat fiber ribbons are being handled. In this example, the teeth 222 are positioned on the ribbon retention portion 210. Other locations for the teeth 222 on the body 211 are possible.

Circumferential recessed regions 230 and 232 of the ribbon retention portion 210 are positioned, respectively, on proximal and distal sides of the teeth 222. Each recessed region 230, 232 is configured to receive a tie, e.g., a T-wrap or zip tie, to clamp the device 200 to the tray 122.

The ribbon retention portion 210 defines a ribbon insertion slot 240. The ribbon insertion slot 240 has an open end 242 at the proximal end of the device 200, and an open end 244 at a distal end of the ribbon retention portion 210. The slot 240 allows for lateral insertion, perpendicular to the axis 202 of flat fiber ribbons into the interior ribbon retention volume 246 defined by the ribbon retention portion 210. Lateral insertion of fiber ribbons can be advantageous in that it avoids the need to axially push long lengths of fiber ribbons through the device 200 along the axis 202. Such a process can be cumbersome and time consuming, due to frictional forces between the flat fiber ribbons and the between the flat fiber ribbons and the surfaces of the retention device.

One or both of the proximal end 242 and the distal end 244 of the slot 240 are positioned in a vertical plane defined by the axes 202 and 207. That is, one or both of the proximal end 242 and the distal end 244 of the slot 240 are positioned at a top of the device 200. In the example shown, both the proximal end 242 and the distal end 244 of the slot 240 are positioned in a vertical plane defined by the axes 202 and 207. Between the ends 242 and 244, the axial center line of the slot 240 curves such that, e.g., the location 247 in the slot 240, which is on the center line of the slot 240, is not positioned in a vertical plane defined by the axes 202 and 207. The curvature of the slot 240 can facilitate in retaining flat fiber ribbons that have been installed in the retention volume 246. That is, because of the curvature of the slot 240, the tendency of flat ribbon fibers to pop out of the retention volume 246 via the slot can be minimized.

The ribbon fanout portion 212 includes fins 250, 252, 254, 256. The fins 250, 252, 254, 256 define three ribbon channels 258, 260 and 262. The fins 250 and 256 are outer fins. The fins 252 and 254 are inner fins. Each channel 258, 260 and 262 is configured to accommodate at least one, at least two, at least three, at least four, or more flat fiber ribbons in a vertical orientation. The substantially vertical fins 250, 252, 254, 256 are configured to maintain the flat fiber ribbons in a vertical orientation in the channels 258, 260 and 262.

Each inner fin 252, 254 extends along the axis 202 from a proximal end 264 to a distal end 266. A horizontal width of each inner fin 252, 254 perpendicular to the axis 202 tapers in a narrowing fashion towards the proximal end 264. In some examples, the horizontal width of each inner fin 252, 254 perpendicular to the axis 202 tapers in a narrowing fashion continuously from the distal end 266 to the proximal end 264. In alternative examples, a horizontal width of each inner fin 252, 254 perpendicular to the axis 202 tapers in a narrowing fashion towards both the proximal end 264 and towards the distal end 266.

At the narrow end(s) of the fins 252, 254, the fins 252, 254 are rounded. The tapering of the width of the inner fins 252, 254 and/or the rounding of the ends of the fins 252, 254 can facilitate pushing flat fiber ribbons through the device 200 parallel to the axis 202, in that the narrow regions of the fins and/or the rounded edges can help to guide the flat ribbon fibers into the channels 258, 260, and 262 and minimize interference between a proximal or distal end of a flat fiber ribbon and a proximal or distal end of a fin as the flat fiber ribbon is being pushed into or through the device 200 substantially parallel to the axis 202.

The device 200 includes features that allow the device 200 to be stacked with an identical device 200. The stack of devices 200 can then be secured with the same tie or ties to the tray 122 (FIGS. 3-9). Tabs 224 of an upper device in a stack of devices 200 are configured to engage, e.g., via frictional fit, the inner sides of ribs 270, 272. A planar, exterior horizontal surface 220 of the body 211 positioned in the portion 212 is configured to rest against the horizontal fiber management surface 148 (FIGS. 3-9) of the tray 122. For stacking purposes, the surface 226 defines holes 274 which, for an upper device 200 of a stack, are configured to engage, e.g., by via frictional fit, with projections 276 projection from tops of inner fins 252 and 254 of a lower device 200 in the stack. In addition, notches 278 of a lower device 200 in a stack, are configured to receive projections 280 at the tops of outer fins 250 and 256. Thus, two devices 200 can be stably vertically stacked together by engaging the tabs 224 of one device 200 with the ribs 270, 272 of the other device, by engaging the holes 274 of one device with the projections 276 of the other device, and/or by engaging the notches 278 of one device with the projections 280 of the other device.

Figures 19, 20:
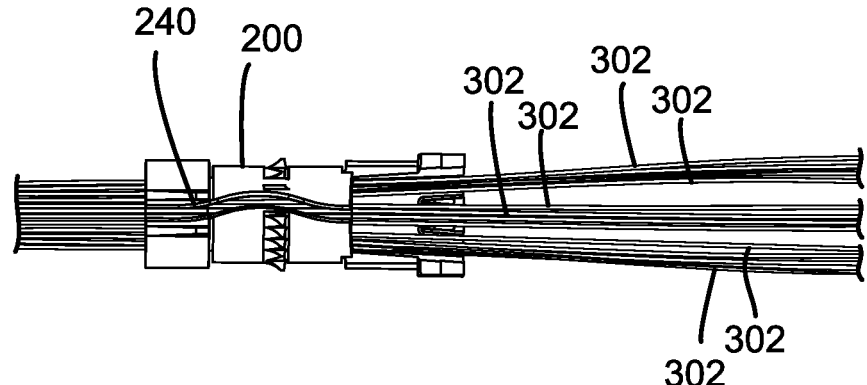
FIG. 19 illustrates the device of FIG. 10 retaining flat optical fiber ribbons.
FIG. 20 illustrates a further embodiment of a sheath termination and fiber ribbon orienting device according to the present disclosure, and retaining flat optical fiber ribbons.

Referring to FIG. 19, a total of six flat fiber ribbons, each containing 12 fibers, are retained and routed through a device 200, illustrated without a sheath. Each ribbon channel is accommodating two of the six flat fiber ribbons 302 in a vertical orientation. The curved nature of the slot 240 is helping to prevent the flat fiber ribbons from escaping the device 200 through the slot 240.

Figures 17, 18:
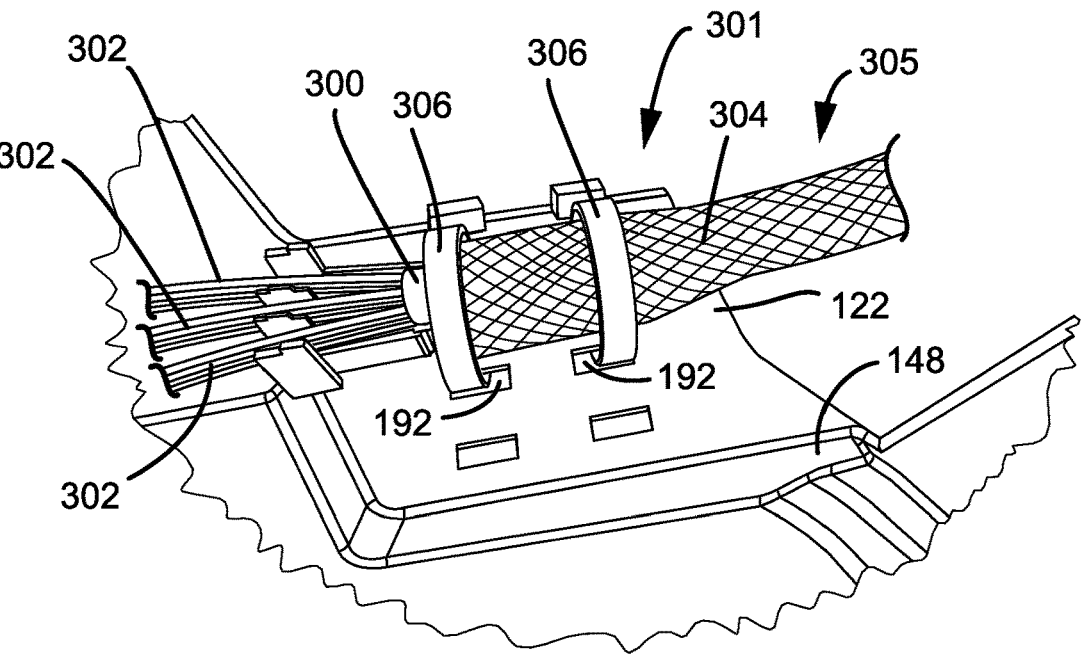
FIG. 17 illustrates a sheath termination and fiber ribbon orienting device in use according to the present disclosure.
FIG. 18 illustrates two sheath termination and fiber ribbon orienting devices in use according to the present disclosure.

FIG. 17 illustrates an assembly 301 including a sheath termination and flat fiber ribbon orienting device 300.

Figure 21:
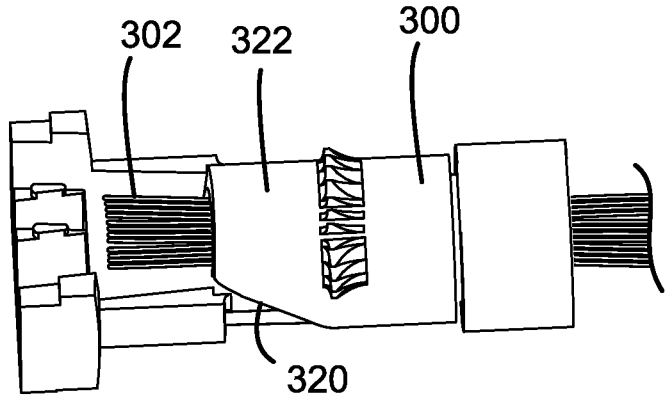
FIG. 21 illustrates a further embodiment of a sheath termination and fiber ribbon orienting device according to the present disclosure, and retaining flat optical fiber ribbons.

Referring to FIGS. 17 and 21, the device 300 is substantially structurally identical to the device 200 described above. However, the ribbon insertion slot 320 does not at any point fall within the vertical plane defined in part by the longitudinal axis of the device 300. Rather, the ribbon insertion slot 320 is substantially at a side of the ribbon retention portion 322 of the device 300. The ribbon insertion slot 320 can be curved like the ribbon insertion slot 240 described above. Providing the ribbon insertion slot 320 at the side, rather than the top, of the device, can further minimize the tendency of vertically oriented ribbons 302 to escape the ribbon retention portion 322 of the device 300.

Referring to FIG. 21, each ribbon channel of the device 300 is accommodating two flat fiber ribbons 302 in vertical orientation. Off the tray 122, a mesh sheath 304 holds the six flat fiber ribbons 302 in a portion 305 of the sheath 304. A distal end portion of the sheath 304 is tied down around the ribbon retention portion 322 to the fiber management surface 148 of the tray 122 using T-wraps (e.g., zip ties) 306 and the exterior teeth of the device 300.

Referring to FIG. 18, two of the assemblies 301 are secured side by side to a fiber management surface 148 of a tray 122. Each assembly 301 is retaining, fanning out, and orienting in a vertical direction, six flat fiber ribbons 302. As described above, two assemblies 301 can be alternatively stacked one above the other, rather than side by side, using the complementary stacking structures of each pair of devices 200, 300.

Referring to FIG. 20 an alternative embodiment of a sheath termination and flat fiber ribbon orienting device 400 is shown. The device 400 is substantially structurally identical to the devices 200 and 300 described above. However, the device 400 does not have a ribbon insertion slot. Thus, to load the flat fiber ribbons 302 into the device 400, the flat fiber ribbons 302 can be inserted parallel to the longitudinal axis of the device 400 through either the proximal or distal end of the device 400. The tapered fins of the device 400, as described above with respect to the device 200, can facilitate this loading process.

In an example method of using a device 200, 300, 400, a plurality flat fiber ribbons having axial portions in a sheath are provided.

The flat fiber ribbons are loaded one at a time, two at a time, three at time, or more than three at a time into the device 200, 300, 400. For the device 200, 300, the loading is performed laterally through the slot 240, 320 and/or axially through the proximal or distal end of the device 200, 300. For the device 400, the loading is performed axially through the proximal or distal end of the device 400.

With a technician's fingers or a tool, e.g., a fiber pick, once loaded into the device 200, 300, 400 the flat ribbon fibers are then oriented into their vertical orientations and positioned to pass through the ribbon channels of the device 200, 300, 400 in suitably sized groups of flat fiber ribbons, e.g., no more than two or no more than three flat fiber ribbons per ribbon channel. In some examples, flat fiber ribbons are loaded into channels beginning from an outer channel and working towards the other outer channel.

Once the flat fiber ribbons have been loaded into the device 200, 300, 400, a distal end portion of the sheath is pulled over the ribbon retention portion of the device 200, 300, 400.

Once the sheath has been pulled over the ribbon retention portion, the sheath and device can be anchored to the fiber management surface of a fiber management tray using one or more ties or other clamps, such as T-wraps (e.g., zip ties), etc.

In some examples, the method includes anchoring multiple devices and their sheaths using the same tie or other clamp.

In some examples, the method includes vertically stacking two or more of the devices one atop another using stacking structures of the devices.

In some examples, the method includes routing one or more of the flat fiber ribbons to a splice holder supported by the tray.

In some examples, the method includes splicing one of the flat fiber ribbons to another flat fiber ribbon.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An assembly, comprising:
a sheath;
flat optical fiber ribbons having longitudinal portions positioned in the sheath, each flat optical fiber ribbon including optical fibers arranged side by side in a row, the row defining a transverse dimension of the flat optical fiber ribbon; and
a flat fiber ribbon management device extending from a proximal end of the device to a distal end of the device along a horizontal axis defined by the device, the sheath being coupled to an exterior surface of the device, the ribbon management device including a device body, the device body including:
a ribbon retention portion;
a ribbon fanout portion including fins defining channels, the channels being configured to maintain the flat optical fiber ribbons within the channels such that the transverse dimension of each flat optical fiber ribbon is substantially aligned with a vertical axis; and
a ribbon insertion slot having an open proximal slot end and an open distal slot end, the ribbon insertion slot extending from a proximal end of the fiber retention portion to a distal end of the fiber retention portion.

2. The assembly of claim 1, further comprising:
a fiber management tray; and
a wrap, the wrap securing the sheath to the device and securing the device and the sheath to the tray.

3. The assembly of claim 1, wherein the device includes teeth projecting from the exterior surface of the device.

4. The assembly of claim 1, wherein the ribbon retention portion is substantially tubular and defines a substantially cylindrical interior surface.

5. The assembly of claim 4, wherein the ribbon retention portion includes a region radially recessed relative to the horizontal axis, the region being configured to receive a wrap.

6. The assembly of claim 1, wherein the slot curves as it extends from the open proximal slot end to the open distal slot end.

7. The assembly of claim 6, wherein at least one of the open proximal slot end and the open distal slot end is positioned at a top of the device.

8. The assembly of claim 6, wherein the open proximal slot end and the open distal slot end are positioned at a top of the device.

9. The assembly of claim 1, wherein neither the open proximal slot end nor the open distal slot end is positioned at a top of the device.

10. The assembly of claim 1, wherein no portion of the slot is positioned at a top of the device.

11. The assembly of claim 1, comprising four of the fins defining three of the channels, wherein at least two of the flat optical fiber ribbons are positioned in each channel.

12. The assembly of claim 1, wherein each flat optical fiber ribbon includes at least 12 optical fibers.

13. The assembly of claim 1, wherein the device body includes mating structures for vertically stacking the device to another device.

14. The assembly of claim 1, wherein one of the fins tapers by narrowing towards a proximal end of the one of the fins.

15. The assembly of claim 2, further comprising a tray support, the tray being pivotally mounted to the tray support, and wherein the tray includes a flat optical fiber ribbon splice holder arrangement configured to secure protective splice bodies of splices of the flat optical fiber ribbons.

16. The assembly of claim 15, wherein the splice holder arrangement includes a vertical stack of splice holder banks.

17. The assembly of claim 1, wherein the sheath comprises a mesh material.

18. A telecommunications closure, comprising:
housing pieces configured to define a sealable and re-enterable closure volume;
the assembly of claim 15 positioned within the closure volume; and one or more cables carrying the optical fibers and entering the closure volume.

19. A method, comprising:

providing a plurality of flat optical fiber ribbons having longitudinal portions positioned in a sheath, each flat optical fiber ribbon including optical fibers arranged side by side in a row, the row defining a transverse dimension of the flat optical fiber ribbon;

loading the flat optical fiber ribbons into a flat fiber ribbon management device extending from a proximal end of the device to a distal end of the device along a horizontal axis defined by the device, the device including a device body, the device body including:

a ribbon retention portion; and a ribbon fanout portion including fins defining channels, the loading including loading the ribbons into both the ribbon retention portion and the ribbon fanout portion;

the loading including inserting the flat optical fiber ribbons through a ribbon insertion slot of the device, the ribbon insertion slot having an open proximal slot end and an open distal slot end, the ribbon insertion slot extending from a proximal end of the fiber retention portion to a distal end of the fiber retention portion;

arranging the flat optical fiber ribbons in the channels such that the transverse dimension of each flat optical fiber ribbon is substantially aligned with a vertical axis; and securing the sheath to an exterior surface of the device.

20. A flat optical fiber ribbon management device extending from a proximal end of the device to a distal end of the device along a horizontal axis defined by the device, comprising:

a device body, including:

a ribbon retention portion;

a ribbon fanout portion including fins defining channels, the channels being configured to maintain flat optical fiber ribbons within the channels, each flat optical fiber ribbon including optical fibers arranged side by side in a row, the row defining a transverse dimension of the flat optical fiber ribbon, the channels being configured to maintain the flat optical fiber ribbons within the channels such that the transverse dimension of each flat optical fiber ribbon is substantially aligned with a vertical axis; and a ribbon insertion slot having an open proximal slot end and an open distal slot end, the ribbon insertion slot extending from a proximal end of the fiber retention portion to a distal end of the fiber retention portion, wherein an exterior surface of the device is configured to couple to a sheath holding the flat optical fiber ribbons.

21. An assembly, comprising:

a sheath;

flat optical fiber ribbons having longitudinal portions positioned in the sheath, each flat optical fiber ribbon including optical fibers arranged side by side in a row, the row defining a transverse dimension of the flat optical fiber ribbon; and a flat fiber ribbon management device extending from a proximal end of the device to a distal end of the device along a horizontal axis defined by the device, the sheath being coupled to an exterior surface of the device, the ribbon management device including a device body, the device body including:

a ribbon retention portion; and a ribbon fanout portion including fins defining channels, the channels being configured to maintain the flat optical fiber ribbons within the channels such that the transverse dimension of each flat optical fiber ribbon is substantially aligned with a vertical axis, wherein the device body includes mating structures for vertically stacking the device body to another device body having the same configuration as the device body.

* * * * *